United States Patent [19]

Lawson et al.

[11] Patent Number: 4,834,481

[45] Date of Patent: May 30, 1989

[54] IN-LINE SINGLE-MODE FIBER OPTIC MULTIPLEXER/DEMULTIPLEXER

[75] Inventors: Christopher M. Lawson, Herndon, Va.; Vincent J. Tekippe, Millersville, Md.; Paul Kopera, Vernon Hills, Ill.

[73] Assignee: Gould Inc., Rolling Meadows, Ill.

[21] Appl. No.: 796,828

[22] Filed: Nov. 12, 1985

[51] Int. Cl.$^4$ ............................................. G02B 6/28
[52] U.S. Cl. ........................... 350/96.15; 350/96.16; 370/1; 370/3
[58] Field of Search ................. 350/96.15, 96.16, 320; 370/1, 3

[56] References Cited

U.S. PATENT DOCUMENTS

| | | | |
|---|---|---|---|
| 4,291,940 | 9/1981 | Kawasaki et al. | 350/96.15 |
| 4,336,047 | 6/1982 | Pavlopoulos et al. | 65/3.31 |
| 4,342,499 | 8/1982 | Hicks, Jr. | 350/96.15 |
| 4,377,403 | 3/1983 | McLandrich | 65/3.11 |
| 4,439,221 | 3/1984 | Smyth et al. | 65/4.21 |
| 4,449,781 | 5/1984 | Lightstone et al. | 350/96.15 |
| 4,523,810 | 6/1985 | Goss et al. | 350/320 |
| 4,556,279 | 12/1985 | Shaw et al. | 350/96.15 |
| 4,557,553 | 12/1985 | McLandrich | 350/96.15 |
| 4,591,372 | 5/1986 | Bricheno et al. | 350/96.15 X |
| 4,632,513 | 12/1986 | Stowe et al. | 350/96.15 X |

FOREIGN PATENT DOCUMENTS 59-08509 11/1984 Japan ................................ 350/96.15

OTHER PUBLICATIONS

Drake, "Low Reflectance Terminations and Connections for Duplex . . . ", *Applied Optics*, vol. 20, No. 9, May 1981, pp. 1640-1644.
Lawson et al., "In-Line Single-Mode Wavelength Division . . . ", *Electronics Letters*, vol. 20, No. 23, Nov. 8, 1984, pp. 963-964.
Cassidy et al., "Wavelength-Dependent Transmission of Monomode . . . ", *Applied Optics*, vol. 24, No. 7, Apr. 1985, pp. 945-950.
SPIE, Aug. 21, 1985, vol. 574, "Monomode Wavelength Division Multiplexer/Demultiplexer", Tekippe et al.
*Optics Letters*, vol. 6, No. 7, Jul. 1981, "Biconical-Taper Single-Mode Fiber Coupler", Kawasaki et al., pp. 327-328.
*Applied Optics*, vol. 22, No. 3, Feb. 1, 1983, "Wavelength Multiplexing in Single-Mode Fiber Couplers", Digonnet et al., pp. 484-491.
"Single-Mode Fused Biconical Taper Fibre Couplers", Ragdale et al., pp. 75-78, First International Conference on Fiber Sensors in London, Apr. 1983.
"Review of Fused Single-Mode Coupler Technology", Ragdale et al., ITT Electro-Optical Products Division (Presented—SPIE—Apr. 84, vol. 479).
*Electronics Letters*, Mar. 1981, "Couplers", Villarruel et al., pp. 243-244.

(List continued on next page.)

Primary Examiner—John D. Lee

[57] ABSTRACT

A single mode fiber optic multiplexer/demultiplexer has first and second optical fibers, each having an input and an output end. The first and second optical fibers are single mode fibers each having a core of a predetermined diameter and a cladding about the core of a predetermined diameter. Along a predetermined length two fibers are placed in juxtaposition and the claddings are fused together to form a fiber optic coupler. Previous to being fused, the claddings are reduced by etching. The coupling of the fiber optic device is such that a first light having a first predetermined wavelength and a second light having a second predetermined wavelength enter together on an input of one of the fibers and are substantially split such that substantially only the first light will appear on an output of one of the fibers and substantially only a second light will appear on an output of the other fiber. When the first and second lights enter on the input end of the first and second fibers, the novel device combines the first and second lights onto one of the output ends of the fibers. In this configuration the device operates as a multiplexer. A method of fabricating the multiplexer/demultiplexer is disclosed.

12 Claims, 5 Drawing Sheets

OTHER PUBLICATIONS

*Photonics Spectra—Communications Spectra,* "Multiple Gains with Single-Mode", Jun. 1983, pp. 53-59.
"Analysis of a Fused Biconical Single-Mode Fiber-Optic Coupler", Bures et al., pp. 1-10, Feb. 1983 O.S.A.
SPIE—Apr. 1984, vol. 479, "Performance Evaluation of Single-Mode Couplers", Kopera et al.
SPIE—Apr. 1983, "Evanescent Wave Fiber-Optic Couplers: Three Methods", Beasley et al.
*Advances in Ceramics* 2, 1981, "Evanescent Wave Coupling of Optical Fibers", Tekippe, pp. 48-52.
ITT Electro-Optical Products Division, "Single-Mode Coupler Research at ITT", M. H. Slonecker, pp. 1-10.
Translation of Article in Applied Optics, vol. 22, "Analysis of a Fused Biconical Single-Mode Fiber-Optic Coupler", Bures et al., pp. 1918-1922 (1983).
"Single-Mode Directional Couplers", V. J. Tekippe et al., pp. 1-6, Laser Focus, May 1985.
*Proceedings* SPIE, vol. 417, Apr. 1983, "Evanescent Wave Fiber Optic Couplers: Three Methods", Beasley et al., pp. 36-42.
*Journal of Lightwave Technology,* vol. LT-2, No. 4, Aug. 1984, "Review and Status of Wavelength-Division-Multiplexing Technology and Its Application", Ishio et al., pp. 448-463.
*Journal of Lighwave Technology,* vol. LT-2, No. 4, Aug. 1984, "Wavelength Multiplexing Components—A Review of Single-Mode Devices and Their Applications", G. Winzer, pp. 369-378.

IN-LINE SINGLE-MODE FIBER OPTIC MULTIPLEXER/DEMULTIPLEXER

BACKGROUND OF THE INVENTION

The present invention relates to fused evanescent wave couplers and, in particular, to a single-mode fiber optic multiplexer/demultiplexer.

Wavelength division multiplexing has become an important tool for increasing the data transmission capacity of fiber optic communication systems and local area networks. Multiplexer/demultiplexers have been fabricated in multimode fiber telemetry systems using prisms, gratings and interference filters to combine or separate two wavelengths. Because of the lower loss and higher bandwidth of single-mode fiber telemetry systems, there is increasing interest in developing practical single-mode fiber optic multiplexer/demultiplexers for these systems.

The prior art has suggested that high quality single-mode fiber optic multiplexer/demultiplexers could be fabricated by using the natural wavelength dependence of the coupling in evanescent wave couplers. For an evanescent wave coupler to serve as a multiplexer/demultiplexer at two preselected wavelengths, however, it is necessary to adjust the wavelength dependence of the coupling ratio (defined as the coupled power divided by the sum of the transmitted and coupled power) until the coupling ratio is equal to 05 at one wavelength and 100% at the other wavelength. Polished substrate couplers have been used to fabricate such multiplexer/demultiplexers with the wavelength characteristics of the devices adjusted by changing the relative position between the two polished substrates. In principle, one should be able to obtain multiplexer/demultiplexers at any two wavelengths of interest by appropriately adjusting the wavelength dependence of the coupling ratio for these polished substrate couplers. However, in general, the long term stability and environmental sensitivity of these polished couplers has been shown to be inferior to that of fused couplers and thus there has been significant interest in developing fused coupler multiplexer/demultiplexers.

The technology required to produce high quality fused evanescent wave couplers has progressed to the point that fiber optic couplers with less than 0.05 dB loss and virtually no temperature or polarization sensitivity are now readily available. Previous efforts to develop fused coupler wavelength multiplexer/demultiplexers, however, have been limited to measuring the wavelength dependence of these couplers and mapping out wavelengths where the coupler would function as a multiplexer.

The present invention is an improvement over the prior art and features a process for fabricating a multiplexer/demultiplexer at two preselected wavelengths. The present invention also is a novel fused coupler where the wavelength dependence of the coupling ratio has been altered such that the coupler acts as a wavelength multiplexer/demultiplexer at wavelengths of 1.32 $\mu$ and 1.55 $\mu$. These wavelengths were selected since laser-transmitters at 1.32 $\mu$ and 1.55 $\mu$ are becoming the light sources of choice for many high speed single mode telemetry systems because of the low loss and low dispersion exhibited by fibers at these wavelengths.

SUMMARY OF THE INVENTION

The novel multiplexer/demultiplexer has first and second optical fibers, each having an input and end and an output end. The first and second optical fibers are single mode fibers each having a core of a predetermined diameter and a cladding about the core of a predetermined diameter. Along a predetermined length two fibers are placed in juxtaposition and fused together to form a fiber optic coupler. Previous to being fused, the claddings are reduced by etching. The coupling of the fiber optic device is such that a first light having a first predetermined wavelength and a second light having a second predetermined wavelength enter together on an input of one of the fibers and are substantially split such that substantially only the first light will appear on an output of one of the fibers and substantially only a second light will appear on an output of the other fiber. In this configuration the device functions as a demultiplexer. When the first and second lights enter on the input ends of the first and second fibers, the novel device combines the first and second lights onto one of the output ends of the fibers. In this configuration the device operates as a multiplexer.

In another embodiment the same multiplexer/demultiplexer pair can be used for duplex communication wherein the first and second lights traverse the system in opposite directions along the common communication fiber.

The method of constructing such a fiber optic multiplexer/demultiplexer comprises the steps of selecting a first light having a first predetermined wavelength and a second light having a second predetermined wavelength. A predetermined amount of cladding is removed from at least one of the optical fibers. An input end of one of the optical fibers is illuminated with both the first and second lights. The first and second optical fibers are placed in juxtaposition along the predetermined length and are fused while applying axial tension to the fibers to effect substantially simultaneous stretching of the fibers during fusing. While the fibers are being fused, the output ends of the first and second optical fibers are monitored to detect the first predetermined wavelength at one output and the second predetermined wavelength at the other output. The stretching of the fibers during fusing ceases when the light output of the first fiber substantially reaches a maximum and when the light output of the second fiber substantially reaches a minimum.

BRIEF DESCRIPTION OF THE DRAWINGS

The features of the present invention which are believed to be novel are set forth with particularity in the appended claims. The invention together with further objects and advantages may best be understood by reference to the following description taken in conjunction with the accompanying drawings, in the several figures of which like reference numerals identify like elements, and in which:

FIG. 5A is a schematic depiction of the present invention used as a multiplexer and as a demultiplexer, while

DESCRIPTION OF THE PREFERRED EMBODIMENT

As is known in the prior art, a tapered fused coupler is fabricated by bringing two fibers together and then tapering and fusing with an appropriate heat source while monitoring the transmitted and coupled output intensities. The tapering is stopped when the desired coupling (at wavelength λ) is obtained. However, if the tapering process is continued, the coupled power undergoes sinusoidal oscillations or "beats". The coupler is said to have been pulled through one beatlength when the coupled power has cycled through one complete sinusoidal oscillation back to zero. The coupling ratio will be equal to zero when the coupler is pulled through integer multiples of one beatlength and will be equal to 100% at half-integer multiples of one beatlength. By selecting the input wavelength equal to 1.32 μ, it is possible to set the coupling ratio equal to 0% or 100% at 1.32%. However, for the coupler to function as a multiplexer/demultiplexer, the wavelength dependence of the coupling ratio must be such that the coupling ratio is also correct at 1.55 μ. The wavelength dependence of the coupling ratio is strongly dependent on the number of beatlengths that the coupler is pulled through. Thus, it should be possible to adjust the wavelength dependence of the coupling ratio as desired by pulling the coupler through the appropriate number of beatlengths.

The number of beatlengths that the coupler should be pulled through at 1.32 μ was empirically determined by pulling several couplers to integer or half integer multiples of one beatlength at 1.32 μ and then mapping out the resulting coupling ratio vs. wavelength. The wavelength dependence of the coupling ratio was measured by illuminating the primary input lead of the fused coupler with a chopped white light source. The light emitted by each output lead was in turn directed into an Oriel model 7240 spectrometer with a PbS detector. The coupling ratio at each wavelength was calculated as the coupled power divided by the sum of the transmitted and the coupled power.

Figure 1:
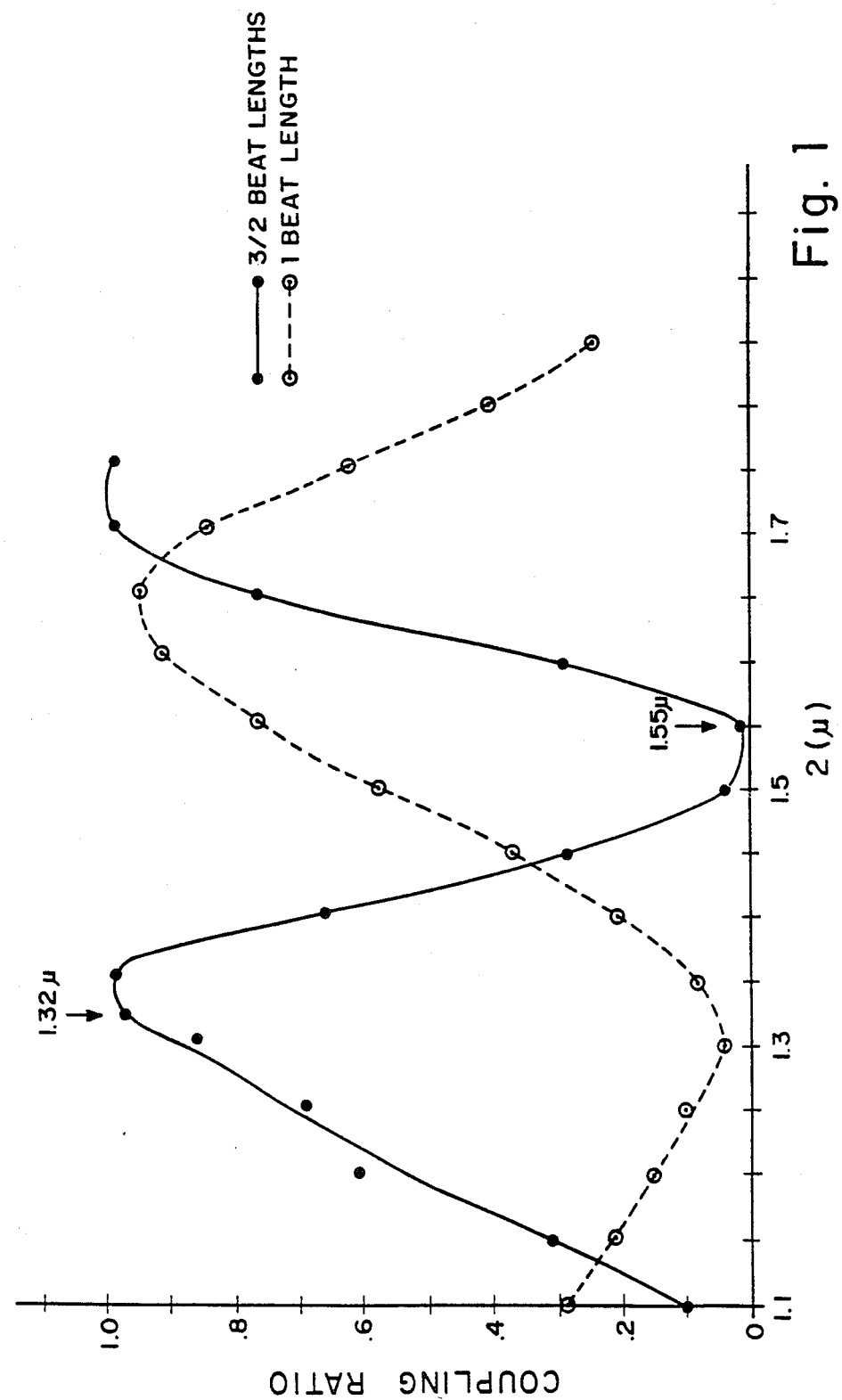
FIG. 1 is a graph of the wavelength dependence of the coupling ratio of a tapered fused coupler drawn through 1 beatlength and 3/2 beatlengths.
Figure 2A:
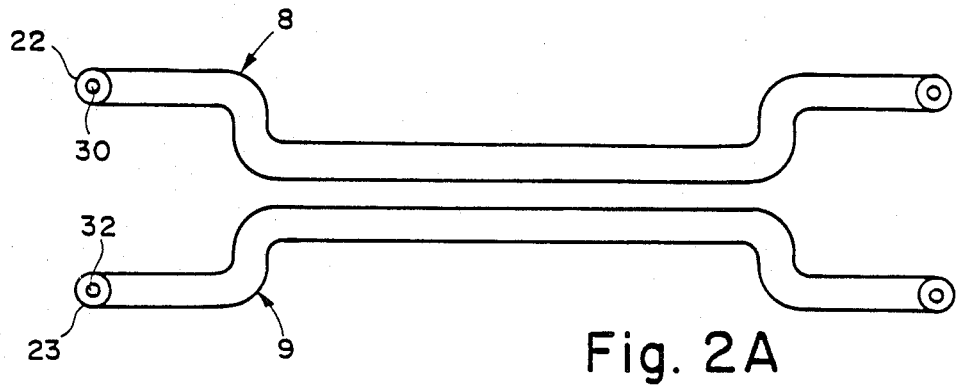
FIGS. 2A-2D are depictions of the novel fiber optic multiplexer/demultiplexer and the method of fabricating it.
Figure 2B:
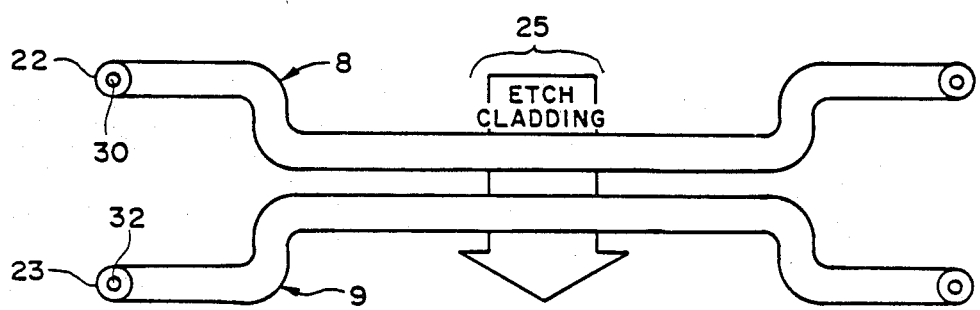
Figure 2C:
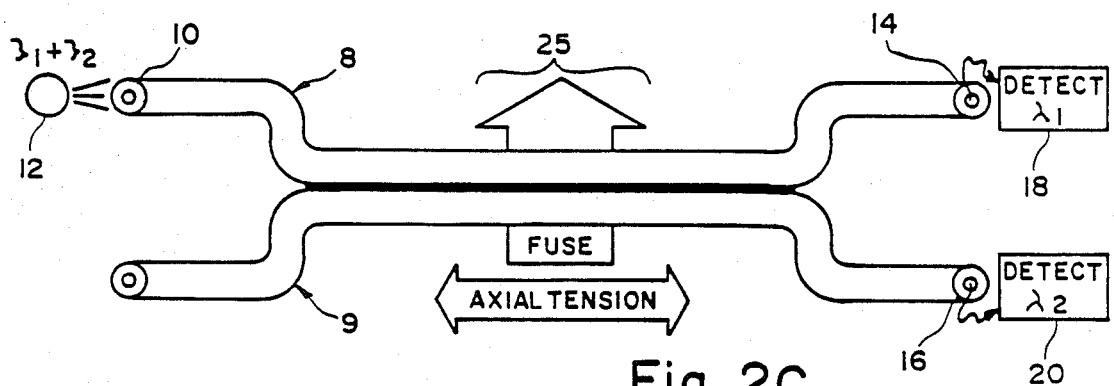
Figure 2D:
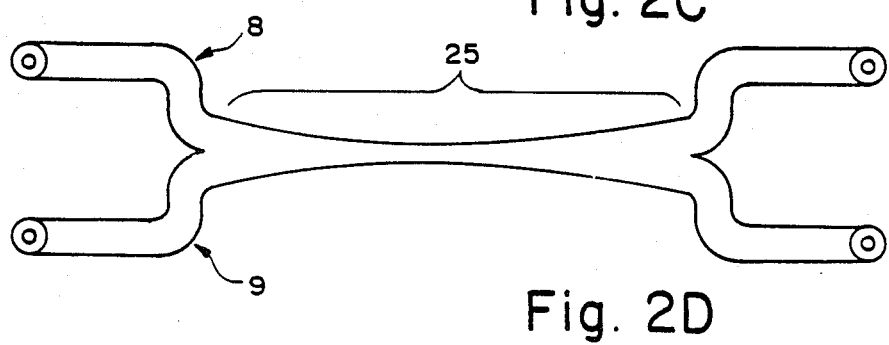

FIG. 1 shows the coupling ratio for a coupler pulled through one complete beatlength (at a wavelength of 1.32 μ) and for another pulled 3/2 beatlengths. The coupling ratio for both couplers undergoes a sinusoidal oscillation with wavelength as expected. The wavlength interval required for the coupling ratio to go from a maximum to a minimum is about 0.35% for the coupler pulled through one beatlength and, hence, this coupler will not function as a multiplexer for 1.32 μ and 1.55 μ light. On the other hand, the wavlength interval required for the coupling ratio to go from a maximum to a minimum for the coupler pulled 3/2 beat-lengths was approximately 0.23 which is the wavelength dependence needed for a multiplexer/demultiplexer at 1.32 μ and 1.55 μ.

The performance of this device is as described below. As can be seen from the solid line in FIG. 1, the coupling ratio at 1.32 μ was 1.6%. When a 1.32 μ light source is connected to the primary input lead and a 1.55 μ light source is connected to the secondary input lead, it was found that approximately 96.5% of the 1.32 μ light was coupled onto the secondary output lead and 97.5% of the 1.55 μ light was coupled into the same output lead. Thus 1.32 μ light was coupled onto the secondary output lead with a total loss of only 0.15 dB, and the 1.55 μ light was coupled onto the secondary input lead with a total loss of only 0.10 dB. When used as a demultiplexer, the coupler provides 16 dB of isolation at 1.32 μ and 18.5 dB of isolation at 1.55 μ.

In addition to the low loss, one of the primary advantages with using fused couplers as multiplexer/demultiplexers is the ruggedness and insensitivity to input polarization and environmental effects such as temperature. The variation of the coupling ratio with input light polarization was found to be less than 1% for all possible input polarizations with a 1.32 μm light source. The variation of the coupling ratio with temperature was found to be only $6 \times 10^{-5}/°$ C. for temperature changes from 0° C. to 60° C. The multiplexer/demultiplexer retains the small size and ruggedness characteristic of fused couplers.

Figure 3:
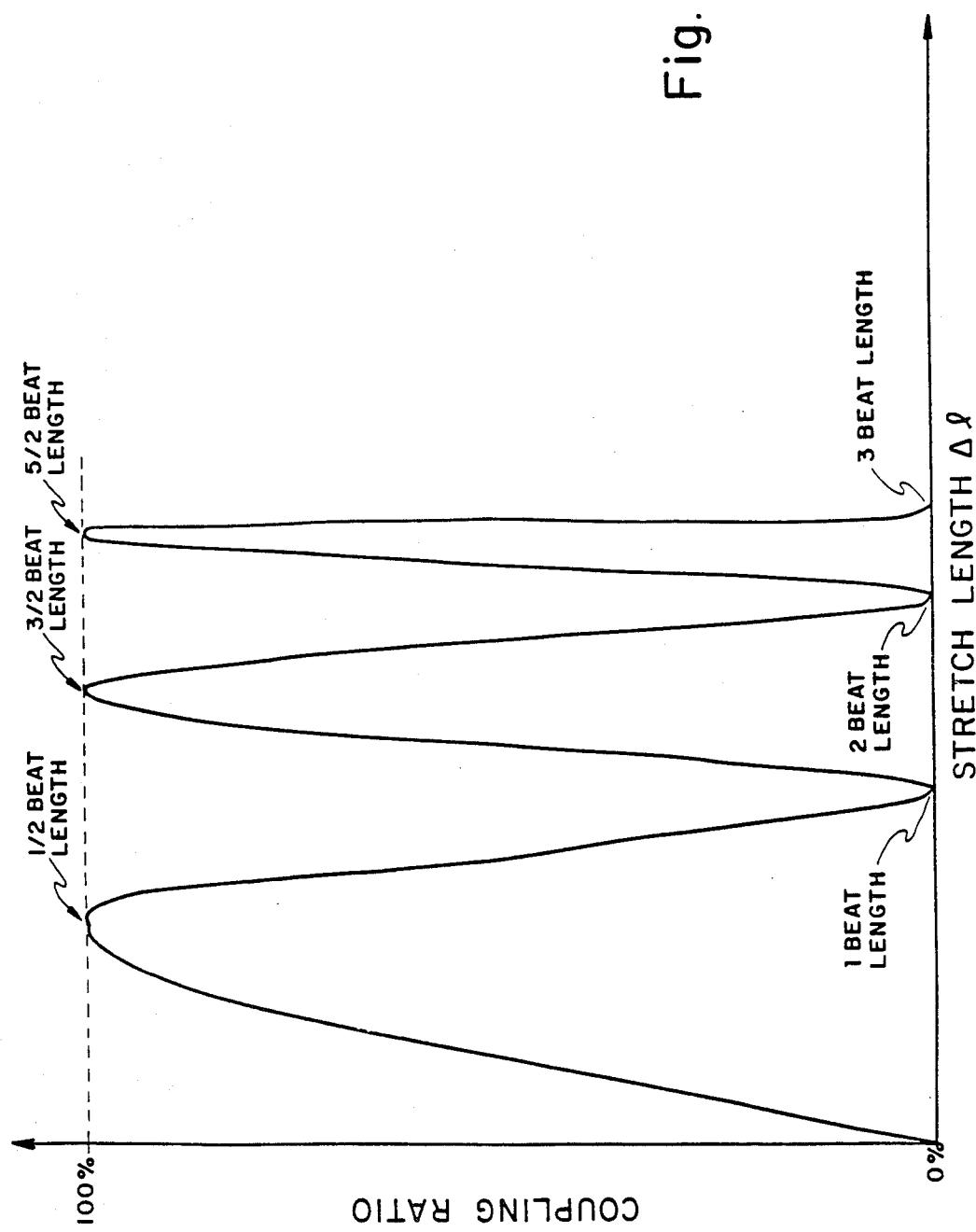
FIG. 3 is a graph of the coupling ratio versus the stretch length of a tapered fused coupler for different beatlengths.

FIGS. 2A-2D illustrate the method of constructing the novel multiplexer/demultiplexer from two single mode optical fibers 8 and 9. Prior to the pulling of a fused evanescent wave coupler, one lead 10 of the primary input lead is illuminated with light from source 12, and the primary and secondary output leads 14 and 16 are monitored by detectors 18 and 20. To fabricate the multiplexer/demultiplexer, it is necessary to illuminate the primary lead 10 with light of wavelength $\lambda_1$ and $\lambda_2$. When the pulling process is initiated, the light from both of the monitored output leads 14 and 16 will undergo sinusoidal oscillations, and thus the coupling ratio (at wavelength $\lambda_1$, for example) will also undergo sinusoidal oscillations, which are called beatlengths. A multiplexer/demultiplexer must either have 0% coupling ratio at wavelength $\lambda_1$ (and a 100% coupling ratio at wavelength $\lambda_2$) or a 100% coupling ratio at wavelength $\lambda_1$ and a 0% coupling ratio at wavelength $\lambda_2$. As the coupler is pulled through multiple beatlengths at wavelength $\lambda_1$, the coupling ratio will be equal to 100% at integer multiples of ½ beatlength (see FIG. 3), and the coupling ratio will be equal to 0% at integer multiples of 1 beat length. It is thus possible to tune the coupler to the desired coupling ratio at wavelength $\lambda_1$ by stopping the pulling process at the integer or half integer multiple of a beatlength. The wavelength periodicity of the coupling ratio will increase as the coupler is pulled through multiple beatlengths so the wavelength dependence of the coupling ratio can be grossly adjusted (but not fine tuned) by pulling the coupler to the required number of beatlengths. As can be seen from FIG. 1, the wavelength periodicity of the coupler varies strongly with the number of beats that the coupler is pulled through. One can therefore pull the coupler at one of the wavelengths of interest, $\lambda_1$ (which was equal to 1.32 microns for the multiplexers that were fabricated) and stgop the pulling process as soon as the coupling ratio is equal to 0% or 100%. The number of beatlengths that the coupler is pulled through is determined by the slope of the coupling ratio vs. wavelength required in order to obtain the desired coupling ratio at the other wavelength $\lambda_2$ (which was equal to 1.55 microns for this case). As can be seen from FIG. 1, the proper wavelength periodicity for a multiplexer designed to operate at 1.32 microns and 1.55 microns was obtained when the coupler was pulled to 3/2 beatlengths at 1.32 microns.

Figure 4:
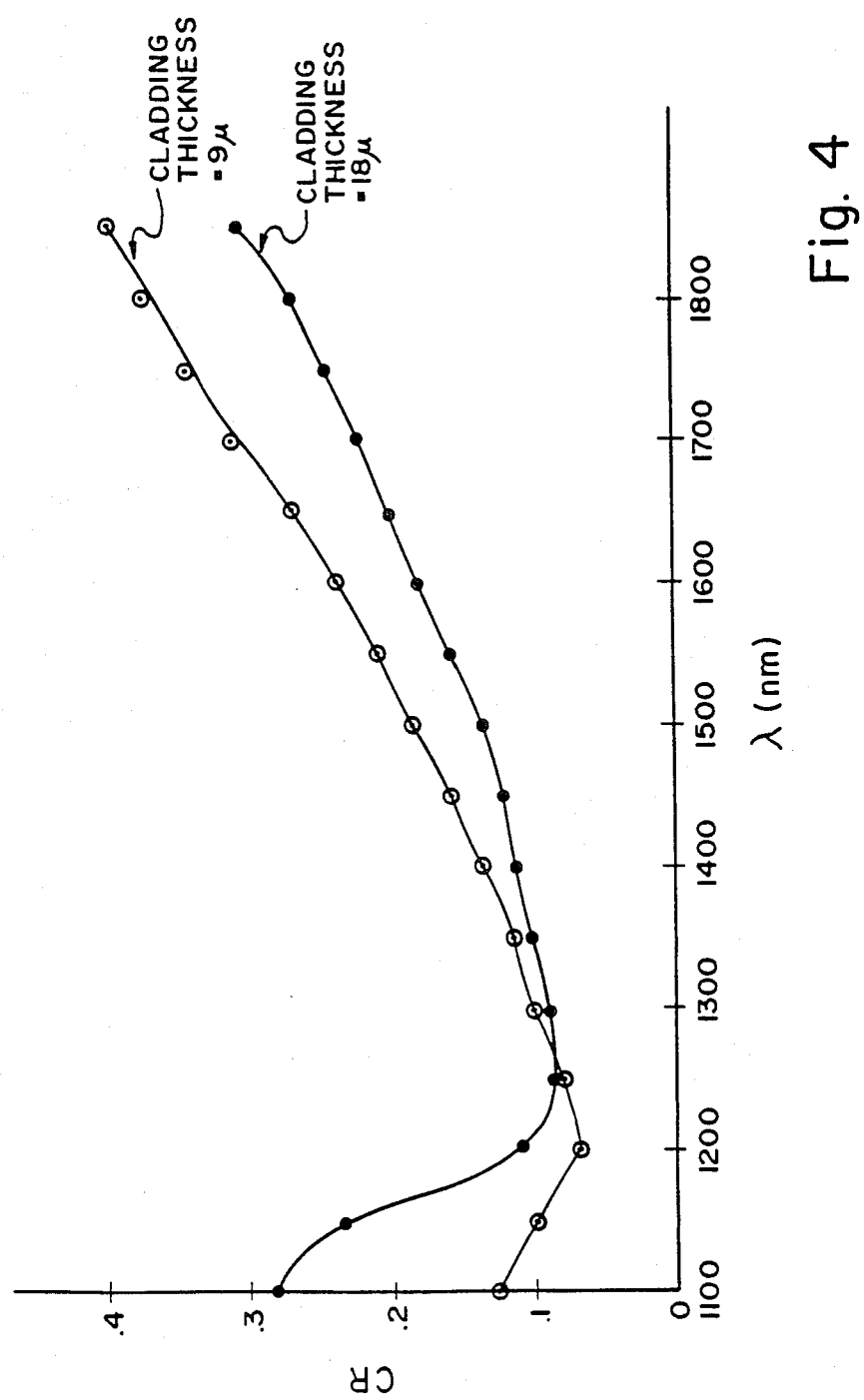
FIG. 4 is a graph of coupling ratio versus wavelength illustrating the effect of etching the cladding of the optical fibers before fusing.

However, the method of pulling the coupler to the required number of multiple beatlengths is a relatively coarse way of tuning to obtain the proper slope for the coupling ratio vs. wavelength. There is also a need for providing for small adjustments of the coupling ratio vs. wavelength curve. This can be accomplished by altering the cladding thickness 22, 23 of one or both of the fibers 8 and 9. Altering this cladding thickness 22 before fusion will change the separation between the two fiber cores 30, 32 after fusion, which will change the wavelength dependence of the coupling ratio. Such etching techniques are known in the prior art for altering the cladding thickness 22. As can be seen from FIG. 4, the slope of the coupling ratio vs. wavelength will be decreased by increasing the cladding thickness.

Figure 5A:
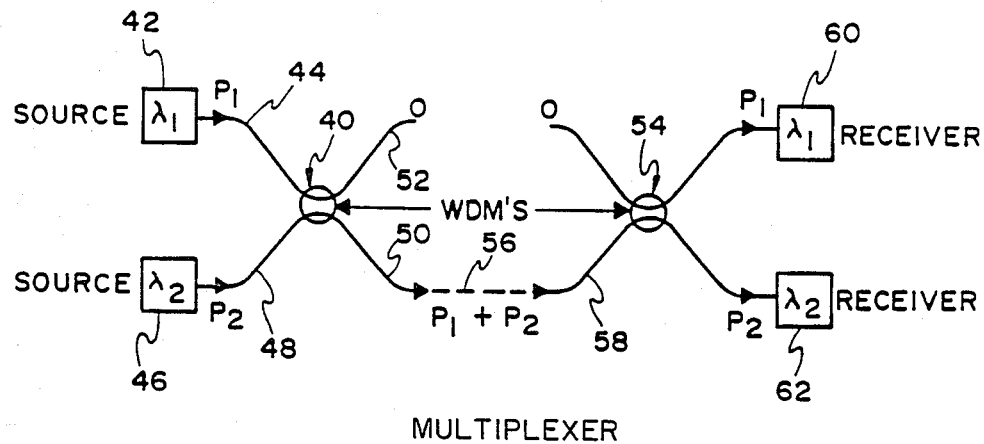

The coupler will act as a multiplexer 40 as shown on the left side of FIG. 5A. The light source 42 with wavelength $\lambda_1$ is connected to the primary input lead 44 of the coupler 40 and the light source 46 with wavelength $\lambda_2$ is connected to the secondary input lead 48 of the coupler 40. Since the coupling ratio at wavelength $\lambda_1$ is 100%, all of the light at wavelength $\lambda_1$ is coupled from the primary input 44 into the secondary output fiber 50. The coupling ratio at wavelength $\lambda_2$ is 0%, so none of the light at $\lambda_2$ from the secondary input 48 will be coupled into the primary output 52, i.e., all light at wavelength $\lambda_2$ will go into the secondary output 50. Therefore, it can be seen that using this multiplexer 40, all of the light at wavelengths $\lambda_1$ and $\lambda_2$ will be combined (i.e. multiplexed) onto the secondary output 50.

This same coupler can also be used as a wavelength demultiplexer 54 as shown on the right side of FIG. 5A. If light of wavelengths $\lambda_1$ and $\lambda_2$ is combined on a a single fiber 56, the two wavelengths can be separated out (i.e. demultiplexed) by fusing this fiber 56 onto one lead 58 of the demultiplexing coupler 54. Since the coupling ratio of wavelength $\lambda_1$ is 100%, all of the light with wavelength $\lambda_1$ is separated out to the top receiver 60. Similarly, the coupling ratio at wavelength $\lambda_2$ will be separated out into the bottom receiver 62.

Figure 5B:
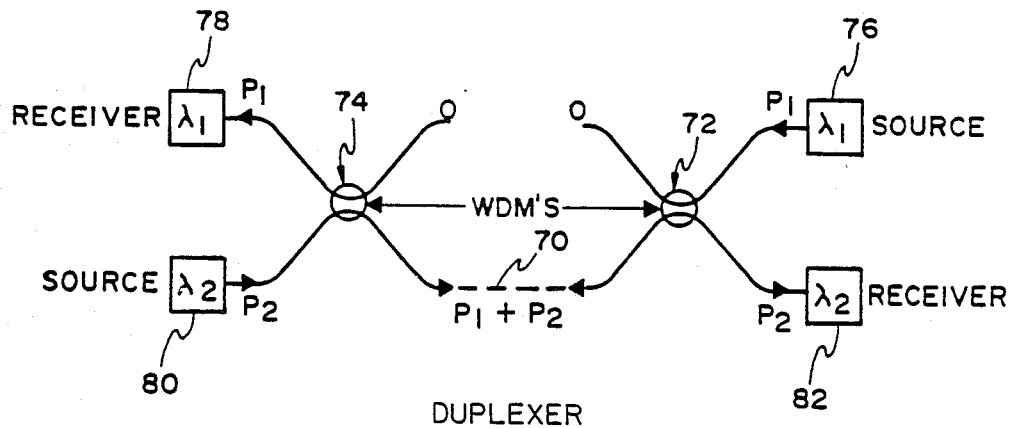
FIG. 5B illustrates duplex communication using the present invention.

The coupler can also be used in duplex communication as shown in FIG. 5B. In this configuration wavelengths $\lambda_1$ and $\lambda_2$ travel in opposite directions in the single fiber 70. The couplers 72 and 74 therefore cause wavelength $\lambda_1$ to be coupled onto the fiber 70 from light source 76 and decoupled from the fiber 70 to be received by receiver 78. As previously explained, the light source 80 for wavelength $\lambda_2$ is operatively connected to the receiver 82 without any coupling effect on wavelength $\lambda_2$ in the couplers 72 and 74.

The novel multiplexer/demultiplexer is an in-line device, i.e., the fiber is never broken, and thus it does not suffer from the problems (loss, sensitivity to environmental perturbations) characteristic of bulk-optic devices. Because of its solid fused construction, it does not suffer from the long-term drifts that often plague polished couplers. And, as opposed to prior art fused couplers, the device functions as a wavelength multiplexer/demultiplexer at two pre-selected wavelengths, as opposed to selecting wave-lengths that just happen to make a particular coupler function as a wavelength multiplexer/demultiplexer as has been done previously.

The invention is not limited to the particular details of the method and apparatus depicted and other modifications and applications are contemplated. Certain other changes may be made in the above-described method and apparatus without departing from the true spirit and scope of the invention herein involved. It is intended, therefore, that the subject matter in the above depiction shall be interpreted as illustrative and not in a limiting sense.

What is claimed is:

1. A fiber optic duplexer comprising:

first and second optical fibers each having first and second ends, and each having a core of predetermined diameter and a cladding about said core of predetermined diameter.

predetermined lengths of each of said first and second optical fibers in juxtaposition, with said cladding of said fibers fused together, said cladding in said predetermined length of at least one of said fibers having a predetermined diameter less than its diameter outside of said predetermined length;

wherein coupling of said first and second optical fibers causes a first light having a first predetermined wavelength entering on said second end of said second fiber to be transferred to said first end of said second fiber and causing a second light having a second predetermined wavelength entering on said first end of said second fiber to appear on said second end of said second fiber, and first and second lights traveling in opposite directions at said second end of said second fiber.

2. The fiber optic duplexer as described in claim 1 wherein both said first and second fibers have claddings of reduced diameter along said predetermined length where the claddings are fused together as compared to the diameter of the claddings outside of said predetermined length.

3. The fiber optic duplexer as described in claim 1 wherein said first and second optical fibers are single mode optical fibers.

4. The fiber optic duplexer as described in claim 1 wherein said first predetermined wavelength is approximately 1.32 microns and said second predetermined wavelength is approximately 1.55 microns and wherein said first and second optical fibers are coupled in said predetermined length to produce approximately 3/2 beatlengths of wavelength preriodicity for said first predetermined wavelength of 1.32 microns.

5. A method of constructing a fiber optic multiplexer/demultiplexer, comprising the steps of:

selecting a first light having a first predetermined wavelength;

selecting a second light having a second predetermined wavelength;

removing a predetermined amount of cladding from at least one of a first optical fiber and a second optical fiber, the first and second optical fibers each having a core of predetermined diameter and a cladding of predetermined diameter surrounding the core;

illuminating an input end of one of the first and second optical fibers with both the first and second lights;

positioning the first and second optical fibers in juxtaposition along a predetermined length;

fusing the claddings of the first and second optical fibers while applying axial tension to the first and second optical fibers to effect substantially simultaneous stretching of the first and second optical fibers during fusing;

monitoring an output end of the first optical fiber during fusing to measure the light output at the first predetermined wavelength;

monitoring an output end of the second optical fiber during fusing to measure the light output at the second predetermined wavelength; and ceasing to stretch the first and second optical fibers when the light output of the first optical fiber substantially reaches a maximum and when the light output of the second optical fiber substantially reaches a minimum.

6. The method described in claim 5, wherein the first and second optical fibers are stretched through approximately 3/2 beatlengths and wherein the first predetermined wavelength is approximately 1.32 microns and the second predetermined wavelength is approximately 1.55 microns.

7. The method described in claim 5 wherein a predetermined amount of cladding is removed from both of the first and second optical fibers prior to fusing.

8. The method described in claim 5 wherein the first and second optical fibers are single mode optical fibers.

9. A fiber optic multiplexer/demultiplexer prepared by a method comprising the steps of:

selecting a first light having a first predetermined wavelength;

selecting a second light having a second predetermined wavelength;

removing a predetermined amount of cladding from at least one of a first optical fiber and a second optical fiber, the first and second optical fibers each having a core of predetermined diameter and a cladding of predetermined diameter surrounding the core;

illuminating an input end of one of the first and second optical fibers with both the first and second lights;

positioning the first and second optical fibers in juxtaposition along a predetermined length;

fusing the claddings of the first and second optical fibers while applying axial tension to the first and second optical fibers to effect substantially simultaneous stretching of the first and second optical fibers during fusing;

monitoring an output end of the first optical fiber during fusing to monitor the light output at the first predetermined wavelength;

monitoring an output end of the second optical fiber during fusing to measure the light output at the second predetermined wavelength; and ceasing to stretch the first and second optical fibers when the light output of the first optical fiber substantially reaches a maximum and when the light output of the second optical fibers substantially reaches a minimum.

10. A fiber optic multiplexer/demultiplexer according to claim 9, wherein the first and second optical fibers are stretched through approximately 3/2 beatlengths and wherein the first predetermined wavelength is approximately 1.32 microns and the second predetermined wavelength is approximately 1.55 microns.

11. A fiber optic multiplexer/demultiplexer according to claim 9, wherein a predetermined amount of cladding is removed from both of the first and second optical fibers prior to fusing.

12. A fiber optic multiplexer/demultiplexer according to claim 9, wherein the first and second optical fibers are single mode optical fibers.

* * * * *

UNITED STATES PATENT AND TRADEMARK OFFICE
CERTIFICATE OF CORRECTION

PATENT NO. : 4,834,481

DATED : MAY 30, 1989

INVENTOR(S) : CHRISTOPHER M. LAWSON ET AL.

Page 1 of 2

It is certified that error appears in the above-identified patent and that said Letters Patent is hereby corrected as shown below:

Page 2, Col. 2, line 12, "*Journal of Lighwave Technology*" should be --*Journal of Lightwave Technology*--.

Col. 1, line 30, "equal to 05 at one" should be --equal to 0% at one--.

Col. 2, line 4, "an input and end and" should be --an input end and--.

Col. 3, line 27, "1.32%." should be --1.32 $\mu$.--;
line 56, "0.35%" should be --0.35 $\mu$--;
line 62, "0.23" should be --0.23 $\mu$--.

Col. 4, line 8, "input lead" should be --output lead--;
line 45, "beat length." should be --beatlength.--;
line 58, "stgop" should be --stop--.

Col. 5, line 33, "combined on a a" should be --combined on a--;
line 60, "wave-lengths" should be --wavelengths--.

UNITED STATES PATENT AND TRADEMARK OFFICE
CERTIFICATE OF CORRECTION

PATENT NO. : 4,834,481

DATED : MAY 30, 1989

INVENTOR(S) : CHRISTOPHER M. LAWSON ET AL.

It is certified that error appears in the above-identified patent and that said Letters Patent is hereby corrected as shown below:

Col. 6, line 20, "of said second fiber and" should be
--of said first fiber and--;
line 23, "fiber, and first" should be
--fiber, said first--;
line 42, "preriodicity" should be --periodicity--.

Signed and Sealed this

Tenth Day of July, 1990

Attest:

HARRY F. MANBECK, JR.

*Attesting Officer*   Commissioner of Patents and Trademarks